(12) United States Patent
Bao et al.

(10) Patent No.: US 12,516,199 B2
(45) Date of Patent: Jan. 6, 2026

(54) TRANSPARENT, WATER RESISTANT, ANTIMICROBIAL AND ANTIVIRAL WATERBORNE COATING COMPOSITION AND APPLICATIONS THEREOF

(71) Applicant: Nano and Advanced Materials Institute Limited, Hong Kong (HK)

(72) Inventors: Su Ping Bao, Hong Kong (HK); Wen Jie Wu, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 18/429,328

(22) Filed: Jan. 31, 2024

(65) Prior Publication Data

US 2024/0287320 A1   Aug. 29, 2024

Related U.S. Application Data

(60) Provisional application No. 63/485,009, filed on Feb. 15, 2023.

(51) Int. Cl.
| | |
|---|---|
| *C09D 5/14* | (2006.01) |
| *C07C 219/08* | (2006.01) |
| *C08F 220/34* | (2006.01) |
| *C09D 5/16* | (2006.01) |
| *C09D 133/14* | (2006.01) |
| *C08F 20/34* | (2006.01) |

(52) U.S. Cl.
CPC ............ *C09D 5/14* (2013.01); *C07C 219/08* (2013.01); *C08F 220/34* (2013.01); *C09D 5/165* (2013.01); *C09D 5/1662* (2013.01); *C09D 5/1668* (2013.01); *C09D 133/14* (2013.01); *C08F 20/34* (2013.01); *C09D 5/1637* (2013.01)

(58) Field of Classification Search
CPC ...... C08F 220/34; C08F 120/34; C08F 20/34; C09D 5/14; C09D 5/1662; C09D 5/1668; C09D 5/1637; C09D 5/165; C09D 133/14
See application file for complete search history.

(56) References Cited

U.S. PATENT DOCUMENTS

| | | |
|---|---|---|
| 5,061,485 A | 10/1991 | Oakes et al. |
| 5,756,145 A | 5/1998 | Darouiche |
| (Continued) | | |

FOREIGN PATENT DOCUMENTS

CN         113416275 A   *   9/2021   ........... C09D 143/04

*Primary Examiner* — Joseph S Del Sole
*Assistant Examiner* — David L Miller
(74) *Attorney, Agent, or Firm* — IDEA Intellectual Limited; Sam T. Yip

(57) ABSTRACT

A polymerizable quaternary ammonium compound (QAC) including an acrylate group and a cationic group is provided. Specifically, the acrylate group is capable of polymerization so as to integrate the QAC into a macromolecular chain of a polymer through an addition polymerization for introducing antimicrobial and antiviral activities. For instance, the polymerizable QAC can be polymerized with a vinyl group monomer, an acrylate monomer, a silane monomer, an adhesion monomer and an emulsification monomer to form a synthesized polymer emulsion. The polymer emulsion can be further incorporated into a coating material to provide a transparent, water resistant, antimicrobial and antiviral waterborne coating on a substrate's surface.

8 Claims, 2 Drawing Sheets

(56) References Cited

U.S. PATENT DOCUMENTS

| | | |
|---|---|---|
| 5,853,745 A | 12/1998 | Darouiche |
| 6,797,278 B2 | 9/2004 | Jackson et al. |
| 7,361,719 B2 | 4/2008 | Moon et al. |
| 7,790,217 B2 | 9/2010 | Toreki et al. |
| 9,549,547 B2 | 1/2017 | Toreki et al. |
| 9,624,384 B2 | 4/2017 | Mason et al. |
| 9,949,477 B2 | 4/2018 | Cunningham et al. |
| 9,957,396 B2 | 5/2018 | Huen et al. |
| 9,999,226 B2 | 6/2018 | Toreki et al. |
| 10,258,046 B2 | 4/2019 | Grossman et al. |
| 10,364,181 B2 | 7/2019 | Borrelli et al. |
| 10,433,545 B2 | 10/2019 | Karandikar et al. |
| 10,721,907 B2 | 7/2020 | Cao et al. |
| 10,850,003 B2 | 12/2020 | Landolina |
| 10,912,299 B2 | 2/2021 | Herdt et al. |
| 10,980,230 B2 | 4/2021 | Sehgal et al. |
| 10,993,441 B2 | 5/2021 | Grossman et al. |
| 2007/0166344 A1 | 7/2007 | Qu et al. |
| 2007/0275472 A1 | 11/2007 | Bertucci |
| 2015/0366879 A1 | 12/2015 | Yamaguchi et al. |
| 2017/0275472 A1 | 9/2017 | Yeung et al. |
| 2018/0028431 A1 | 2/2018 | Chiattello et al. |
| 2020/0146298 A1 | 5/2020 | Borrelli et al. |
| 2020/0172740 A1 | 6/2020 | Ou et al. |
| 2020/0239719 A1* | 7/2020 | Ezaki .................. C09D 11/033 |
| 2020/0253203 A1 | 8/2020 | Sehgal et al. |
| 2021/0023252 A1 | 1/2021 | Furudate et al. |
| 2021/0130642 A1 | 5/2021 | Zha et al. |
| 2021/0169081 A1 | 6/2021 | Grossman et al. |
| 2021/0219545 A1 | 7/2021 | Sehgal et al. |

\* cited by examiner

TRANSPARENT, WATER RESISTANT, ANTIMICROBIAL AND ANTIVIRAL WATERBORNE COATING COMPOSITION AND APPLICATIONS THEREOF

CROSS-REFERENCE TO RELATED APPLICATION

The present application claims priority from U.S. provisional patent application Ser. No. 63/485,009 filed Feb. 15, 2023, and the disclosure of which is incorporated herein by reference in its entirety.

FIELD OF THE INVENTION

The present invention generally relates to the fields of coating materials. More specifically, the present invention relates to a waterborne coating material including a polymerizable quaternary ammonium compound.

BACKGROUND OF THE INVENTION

In the context of the global COVID-19 pandemic, effective environmental disinfection is critical to curb the spread of the virus. While commercial disinfectants are readily available and efficacious, they grapple with the challenge of low durability. Surfaces that have been sanitized may become susceptible to recontamination after the evaporation or decomposition of the disinfectants, necessitating the need for durable solutions on frequently-touched surfaces.

Coating application stands out as a prevalent method for achieving durable antimicrobial surfaces. However, many applied coatings either incorporate metal ions, such as $Ag^+$ or $Cu^+$ nanoparticles, or obscure the surface, as seen with $Zn^{2+}$ nanoparticles. In contrast, polymer coatings offer the advantage of providing highly transparent thin films on diverse surfaces. Therefore, a waterborne polymer coating emerges as a desirable alternative to circumvent the limitations associated with other coating approaches.

Quaternary ammonium compounds (QACs) serve as broad-spectrum antimicrobial agents, operating through a mechanism involving electrostatic interactions between positively charged QAC ions and negatively charged microbial membranes. However, the unique character of QACs raises concerns about durability, given that ionic compounds are typically water-soluble and prone to being washed away during daily use. Additionally, the accumulation of QACs may pose environmental risks due to their relatively low chemical activity at room temperature. Consequently, non-leaching QACs present a more suitable avenue for the development of antimicrobial surfaces.

Waterborne polymer coatings commonly employ emulsifiers to stabilize the dispersion. The introduction of cationic QACs into standard polymer emulsions can induce demulsification due to the salting-out effect. To create non-leaching coatings containing antimicrobial agents, it becomes imperative to form chemical bonds among active ingredients rather than simply mixing them. Moreover, coatings with higher density typically exhibit prolonged longevity. In the realm of polymer coatings, crosslinking stands out as a direct and effective strategy for producing denser films with superior performance in terms of abrasion resistance and water resistance.

There are several QAC-related patents/published applications. U.S. Pat. No. 10,258,046 B2 discloses an antimicrobial composition including coating a surface with an aqueous mixture of triethanolamine, 3-(trihydroxysilyl) propyl dimethyloctadecyl ammonium chloride and 3-chloropropyltrimethoxysilane, and then coating the surface with an aqueous titanyl sol-gel solution comprising an aqueous mixture of peroxotitanium acid and peroxo-modified anatase sol overtop of the silane to form the antimicrobial coating. Such antimicrobial coating exhibits residual antimicrobial efficacy against *E. coli* and *S. epidermidis* after up to 10 times of abrasion. The weight loss after 30 cycles of abrasion by water-moisturized wipes is 33%. The use of 3-chloropropyltrimethoxysilane is found to improve storage stability of the quaternary silane composition and the durability of the antimicrobial coating.

U.S. Pat. No. 10,993,441 B2 discloses a similar aqueous antimicrobial coating composition but extends the scale of QACs to 3-amino propylsilanetriol homopolymer, mixtures of 3-amino propylsilanetriol homopolymer, 3-chloro propylsilanetriol homopolymer and 3-(trihydroxysilyl)propyl dimethyloctadecyl ammonium chloride homopolymer, or any one of various unique organosilane homopolymers having multiple amine functionality.

U.S. Pat. No. 10,912,299 B2 discloses an anti-microbial composition including a quaternary ammonium compound and a cationic biocide. A synergistic combination of the two components with the ratio of cationic biocide to quaternary ammonium being less than 1:10 or with a single quaternary compound in a ratio of less than 1.6 to 1 provides a film-forming coating that has residual anti-bacterial activity and improved durability with strong resistance to general wear between applications. However, the improvement in the longevity of the antimicrobial activity of the disclosed coating is due to high content of antimicrobial agent at 5 to 50 wt. % of a quaternary ammonium compound and 1 to 8 wt. % guanidine-based polymer (PHMG or PHMB) in such compositions.

US Patent Application No. 2020/0253203 A1 discloses an antimicrobial composition including: an antimicrobial component having at least one quaternary ammonium compound; a synthetic polymer that includes: at least one cationic monomer A, optionally, at least one anionic monomer B, and optionally, at least one non-ionic monomer C; an organic acid; and a surfactant selected from cationic surfactants, amphoteric surfactants and combinations thereof, and at least one non-ionic surfactant selected from the group consisting of low hydrophilic-lipophilic balance (HLB) non-ionic surfactants with a delocalized electronic structure that has moderate to poor water solubility. The as-formed polymer coating could maintain 99.9% antimicrobial efficacy after 3 times of wet and 3 times of dry abrasions.

US Patent Application No. 2021/0130642 A1 discloses water-based coatings including an aqueous self-crosslinking system that includes water and an acrylate resin, and a silane adhesion promoter selected from at least one amino-functional silane and at least one oxysilane selected from a mono-, di-, tri-, and tetra-functional oxysilane. After the water-based coatings are applied to a substrate, decorative and protective coatings are formed on the surface of the substrate. The coatings may provide a wide range of color finishes with superior chemical and mechanical resistance. However, the products in the patent do not have antimicrobial activity.

Most of the coatings described above state that the coatings possess acceptable abrasion durability. However, the actual performance regarding wiping resistance is insufficient for regular cleaning. In fact, abrasion is inevitable during daily usage of coated surfaces and the above coatings may not endure hundreds of abrasion cycles, which is a common application scenario for coatings. In addition, the proven antimicrobial performance of QACs provides a potential approach to enhance antimicrobial ability of coatings. However, there remains a technical problem to overcome relating to the compatibility of cationic QACs in emulsion polymerization systems to create durable, transparent antimicrobial coatings. The present invention addresses this need.

SUMMARY OF THE INVENTION

It is an objective of the present invention to provide a transparent, wet wiping-resistant, antimicrobial and antivirus waterborne coating including introducing cationic QAC into emulsion polymerization system to solve the aforementioned technical problems.

In accordance with a first aspect of the present invention, a polymerizable QAC including an acrylate group and a cationic group is provided. Particularly, the acrylate group is capable of polymerization so as to integrate the QAC into a macromolecular chain of a polymer through an addition polymerization for introducing antimicrobial and antiviral activities.

In accordance with one embodiment of the present invention, the acrylate group is a methyl methacrylate group and the cationic group is a long-chain bromoalkane group with 10-16 carbons by polymerizing a vinyl group monomer, an acrylate monomer, a QAC, a silane monomer, an adhesion monomer and an emulsification monomer.

In accordance with one embodiment of the present invention, the vinyl group monomer and the acrylate monomer are related to the transparency of the material, the QAC is an antimicrobial and antiviral agent, the silane monomer provides water resistance to the material, the adhesion monomer increases the adherence of the composition to a substrate and the emulsification monomer is related to the emulsification ability of the coating material.

In accordance with one embodiment of the present invention, the silane monomer contains an acrylate group for polymerization and a methoxy, ethoxy, isopropoxy, or isobutoxy group for hydrolysis and crosslinking.

In accordance with one embodiment of the present invention, the adhesion monomer is selected from a 2-hydroxyethyl acrylate or methacryl-functional silane (e.g. KH 570). Both of them enable the anti-microbial and antiviral ability of the QAC to be durable after wet wiping.

In accordance with one embodiment of the present invention, the emulsification monomer is selected from ethyl methacrylate or acetoacetoxy ethyl methacrylate.

In accordance with one embodiment of the present invention, the synthesized polymer has a structure of the following formula:

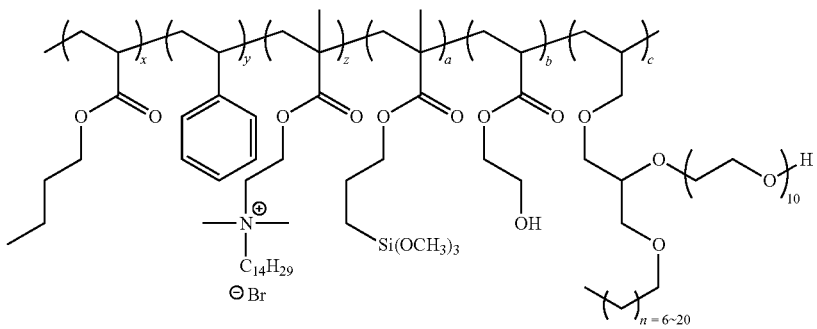

In accordance with one embodiment of the present invention, the acrylate group fixes the cationic group for preventing the cationic group from dissolving into water and enhancing water resistance of the QAC.

In accordance with another embodiment of the present invention, the cationic group includes antiviral and/or antibacterial functional groups.

In accordance with one embodiment of the present invention, the QAC has a structure of the following formula:

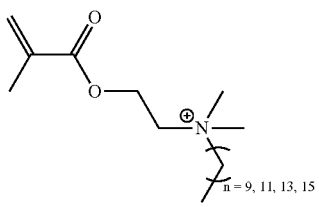

In accordance with a second aspect of the present invention, a transparent, water resistant, antimicrobial and antiviral waterborne coating composition is provided. The coating composition includes a synthesized polymer, fabricated In one embodiment, in order to incorporate the cationic QAC into the emulsion system, it is prepared from synthesizing of styrene and butyl acrylate together with other reactive monomers. A buffer solution having a pH value of around 5.5 is used during the synthesis progress, since the QAC is easy to be precipitated in alkali condition (e.g. pH. 8~9). Noted that the traditional emulsion synthesis of styrene-acrylic emulsion with pH value of 8~9 is not suitable for adopting.

In accordance with another embodiment of the present invention, the silane monomer is connected with the macromolecular chain for ensuring the anti-microbial and antiviral ability of the QAC with durability after wet wiping.

In accordance with a third aspect of the present invention, a method of providing a transparent, water resistant, antimicrobial and antiviral waterborne coating on a substrate is provided. Briefly, a coating material is mixed with a nonionic emulsifier, a buffer solution and an alcohol hydrolysis inhibitor to obtain a coating emulsion, which is subjected to be mixed with a wetting agent, a film-forming agent, a leveling agent and a defoaming agent to form a coating agent. The coating agent may be air sprayed on a substrate to create a transparent, water resistant, antimicrobial and antiviral waterborne coating on the surface of the substrate.

In accordance with one embodiment of the present invention, the nonionic emulsifier is capable of emulsion polymerization for both hydrophilic monomer and hydrophobic monomer.

In accordance with one embodiment of the present invention, the buffer solution is a boron-based or a phosphate-based solution and has a pH value range of 5-6.

In accordance with one embodiment of the present invention, the alcohol hydrolysis inhibitor and the silane monomer of the coating material has the same alkyl chain.

In accordance with another embodiment of the present invention, the wetting agent is a surface additive suitable for solvent-borne, solvent-free and waterborne coating system to reduce surface tension.

In accordance with one embodiment of the present invention, the substrate includes a glass, a metal, a plastic, a rubber and a wood.

BRIEF DESCRIPTION OF THE DRAWINGS

Embodiments of the invention are described in more details hereinafter with reference to the drawings, in which.

DETAILED DESCRIPTION

Figure 1:
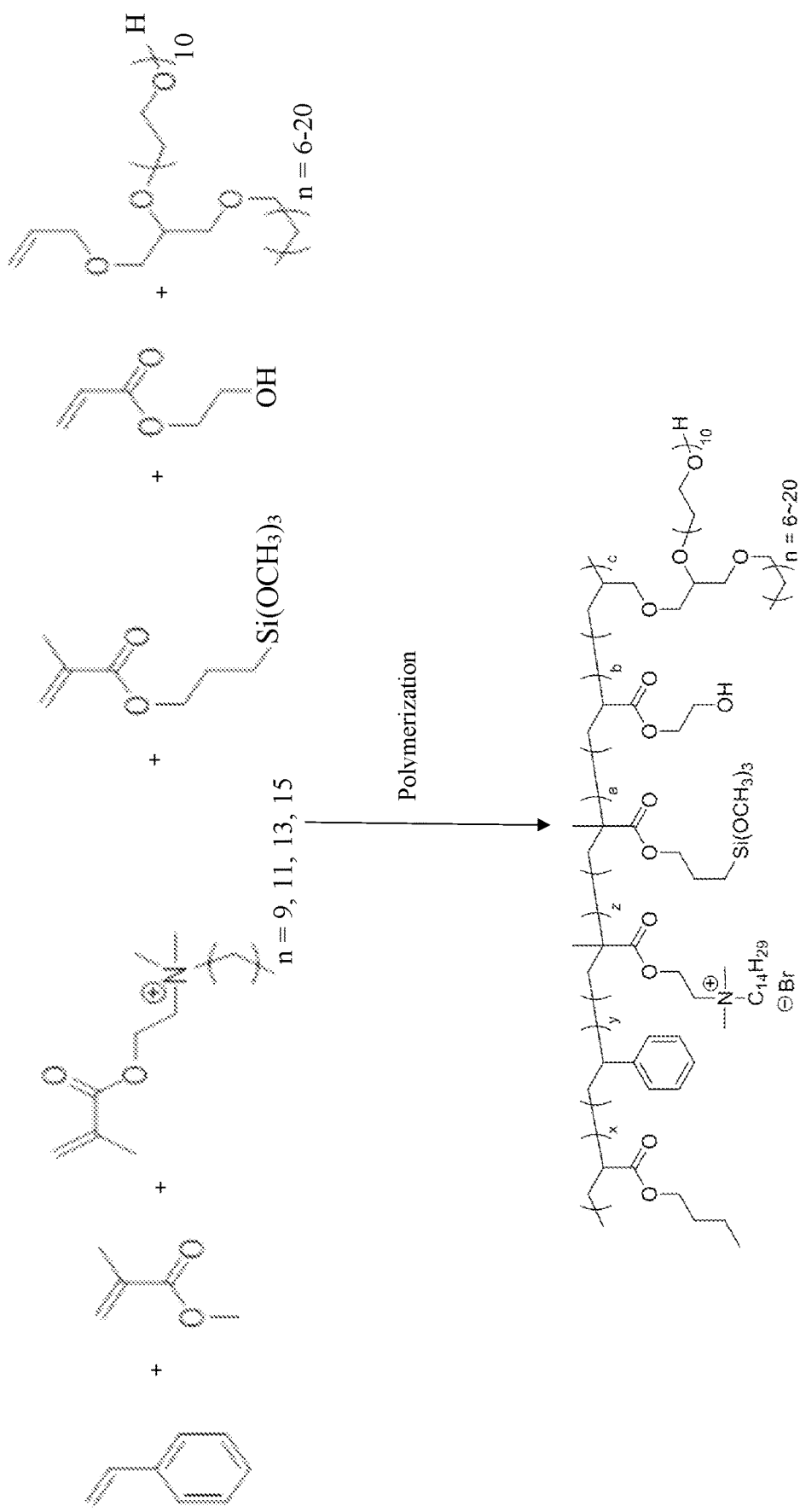
FIG. 1 depicts the polymerization of fabricated polymer integrating QAC.

In the following description, compounds, materials, and/or methods of transparent, water resistant, antimicrobial and antiviral waterborne coating and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Recently, the requirements for antimicrobial materials have expanded, especially during the long-lasting COVID-19 pandemic. The mechanisms of antimicrobial materials usually involve biotoxicity to microbes due to active metal oxides. The organic antimicrobial components can disrupt cell membrane and viral envelopes and inhibit the growth of microbes. Although metal oxides are common additives to functional coatings, they cannot form covalent bonds with polymer chains easily and may have the risk of being washed out. Additionally, they often encounter dispersion issues in the coatings caused by the sedimentation occurring during manufacture, and many of the metal oxides are not colorless. Furthermore, the antimicrobial activity of metal oxides is effective enough only when the surface area of them is adequately exposed, because the metal oxides may be consumed and broken into nanoparticles before use.

In the present invention, organic-based antimicrobial agents, such as QACs, are embedded onto coating polymeric chains by means of grafting, copolymerization, and post-translational modification. They are uniformly dispersed along with the polymer itself to ensure sufficient coverage of the active ingredients on surfaces to be treated. Moreover, QACs are relatively more stable than other disinfectants, such as hydrogen peroxides and chlorine-based compounds. The covalently-bonded antimicrobial agents are more environmentally friendly due to their non-leaching characteristics. Therefore, the present invention discloses provides a polymerizable QAC and a manufacturing method of a QAC-containing polymer coating through copolymerization of the polymerizable QAC as a monomer, functional monomers, and polymerizable emulsifiers. The coating remains antibacterially and antivirally active after 2000 cycles of wet abrasion without obvious color change effects to the substrates.

A "polymerizable QAC" refers to a polymerizable quaternary ammonium compound. This compound is characterized by having the ability to undergo polymerization reactions, forming long-chain molecular structures. The term "quaternary ammonium compound" (QAC) indicates the presence of a positively charged nitrogen atom linked to four organic groups. In the context of polymerization, the QAC is designed to participate in the formation of macromolecular chains during the polymerization process.

In accordance with a first aspect of the present invention, a polymerizable QAC including an acrylate group and a cationic group is provided. It is worth noting that the acrylate group is capable of polymerization so as to integrate the QAC into a macromolecular chain of a polymer through an addition polymerization for introducing antimicrobial and antiviral activities.

Specifically, the acrylate group is identified as dimethylaminoethyl acrylate, while the cationic group is a long-chain bromoalkane group containing between 10 to 16 carbons. This unique combination imparts distinctive properties to the QAC. Notably, the acrylate group plays an important role in securing the cationic group, thereby preventing its dissolution into water. This feature significantly enhances the water resistance of the QAC, making it particularly suitable for various applications. Moreover, the cationic group embedded in the QAC encompasses antiviral and/or antibacterial functional groups, further expanding its utility. The molecular structure of the QAC conforms to the formula:

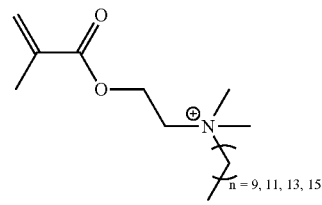

Referring to the above structure, the QAC has the carbonyl functional monomer (the left part) for enhancing the water resistance and the cationic monomer (the right part) for anti-microbial activity. It is worth noting that the cationic monomer is highly water-soluble, and the carbonyl functional monomer can fix the cationic monomer for preventing the cationic monomer from dissolving into water.

In accordance with a second aspect of the present invention, a transparent, water resistant, antimicrobial and antiviral waterborne coating composition is provided.

The composition specifically has a synthesized polymer with a diverse array of monomers, including a vinyl group monomer, an acrylate monomer, the aforementioned QAC, a silane monomer, an adhesion monomer, and an emulsification monomer. The vinyl group monomer and acrylate monomer contribute to the transparency of the material, crucial for applications requiring clarity. The QAC component acts as an efficient antimicrobial and antiviral agent, enhancing the coating's protective features. The silane monomer, incorporating an acrylate group for polymerization and methoxy, ethoxy, isopropoxy, or isobutoxy groups for hydrolysis and crosslinking, imparts robust water resistance to the material. The adhesion monomer, such as 2-hydroxyethyl acrylate or methacryl-functional silane (e.g., KH 570), elevates the adherence of the composition to various substrates. Simultaneously, the emulsification monomer, chosen from ethyl methacrylate or acetoacetoxy ethyl methacrylate, facilitates the emulsification process of the coating composition. The synthesized polymer, represented by the provided structural formula as follow, ensures a synergistic combination of these elements. In particular, the silane monomer is strategically connected with the QAC, fortifying the antimicrobial and antiviral capabilities of the coating composition. The synthesis of the polymer involves a buffer solution with a pH value ranging from 5-6, contributing to the stability and efficacy of the coating composition.

In one embodiment, the synthesized polymer has a structure of the following formula:

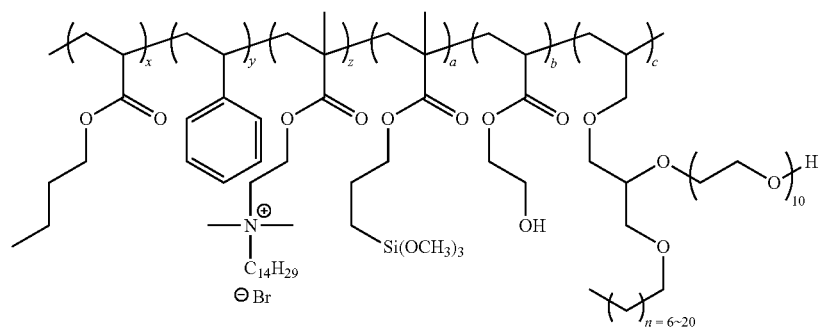

Referring to FIG. 1, the integration of the QAC into macromolecular chains is achieved through polymer emulsion fabrication. By the carbonyl functional monomer of QAC, the QAC is covalently bonded in the main chain of polymer by a polymerization happening among the carbonyl functional monomer, the silane monomer and the acrylate monomer. Further, the QAC also serves as an emulsifier, creating an electrostatic double layer around the lyophilic polymer, thereby stabilizing the emulsion. To enhance coating durability and resistance to wet wiping, a carbonyl functional monomer is introduced into the macromolecular chains, along with a silane monomer, creating dense networks within the final coating films, thereby imparting excellent water resistance. This dual introduction of the carbonyl functional monomer and silane monomer into the macromolecular chains contributes to the formation of robust networks, ensuring the resulting coating films exhibit superior water resistance and durability, particularly against wet wiping.

In accordance with a third aspect of the present invention, a method of providing a transparent, water resistant, antimicrobial and antiviral waterborne coating on a substrate is provided.

The process commences by blending the aforementioned coating composition with a nonionic emulsifier, a buffer solution, and an alcohol hydrolysis inhibitor, resulting in a coating emulsion. The nonionic emulsifier is specifically chosen for its capability in facilitating emulsion polymerization for both hydrophilic and hydrophobic monomers, ensuring a comprehensive and homogenous emulsion. The buffer solution, which can be boron-based or phosphate-based, is incorporated to maintain the pH within the optimal range of 5-6 during the synthesis process, enhancing the stability and effectiveness of the coating. An alcohol hydrolysis inhibitor, sharing the same alkyl chain as the silane monomer of the coating material, is introduced to curtail undesired hydrolysis reactions, preserving the integrity of the coating.

Subsequently, the coating emulsion is mixed with a wetting agent, a film-forming agent, a leveling agent, and a defoaming agent to formulate a coating agent. The wetting agent, chosen for compatibility with solvent-borne, solvent-free, and waterborne coating systems, functions to reduce surface tension.

The resulting coating agent is then air-sprayed onto a substrate, which may consist of glass, metal, plastic, rubber, or wood. This application method ensures the creation of a transparent, water-resistant, antimicrobial, and antiviral waterborne coating on the surface of the substrate, thereby providing a versatile and effective protective layer across various materials and applications.

EXAMPLES

Example 1. Synthesis of a Polymerizable QAC

The synthesis of the polymerizable QAC involves a common quaternization process with an inhibitor to prevent a polymerization reaction. In a three-neck flask equipped with a condenser and dropping funnel, 2-(Dimethylamino) ethyl methacrylate (17.3 g), acetonitrile (50 mL) and butylated hydroxytoluene (0.44 g) are combined and stirred magnetically at 500 rpm to dissolve the solid ingredients. The reaction is then heated to 50° C., and 0.10 mole of 1-Bromoalkane is added dropwise. The mixture is maintained warm for 12 hours, cooled to room temperature, and excess diethyl ether is introduced to a white crystalline precipitate. The crystals are collected, washed with diethyl ether, and dried in a vacuum oven at 50° C., resulting in the polymerizable QAC.

Example 2. Fabrication of a Polymer Emulsion Integrating QAC in Macromolecular Chains To create a polymer emulsion integrating the QAC into macromolecular chains, 0.225 g of azobisisobutyronitrile (AIBN) initiator is dissolved in a mixture of 4 g of styrene and 4 g of butyl acrylate. Simultaneously, 0.75 g of the polymerizable QAC and 0.4 g of a polymerizable non-ionic emulsifier are dissolved in a phosphate buffer. The monomer and initiator mixture is added dropwise, under 350 rpm mechanical stirring for at least 30 mins, with nitrogen purging to obtain monomer A solution.

In a separate solution, 0.075 g of AIBN is dissolved in a mixture of 16 g of styrene and 16 g of butyl acrylate. Additionally, 2.25 g of the polymerizable QAC and 1.6 g of polymerizable non-ionic emulsifier are added to a phosphate buffer. The mixture of monomers and initiator is then added dropwise into the aqueous solution, under 350 rpm mechanical stirring for at least 30 minutes, with nitrogen purging. A functional monomer, such as 3-(Trimethoxysilyl)propyl methacrylate or 2-Hydroxyethyl acrylate, is introduced during stirring. This results in monomer B solution, a pre-emulsified mixture.

The monomer A solution is introduced into a flask with nitrogen purging and stirred at 230 rpm at 75° C. Monomer B is then added dropwise with a speed of 0.2 mL/min for the first 10 mL, 0.4 mL/min for the following 30 mL, and 0.6 mL for the remaining. The stirring speed increases to 300 rpm after the first hour. 2-methylpropionamidine dihydrochloride (AIBA) is added into the flask at a speed of 0.015 mL/min for a total amount of 1 mL. After all reactants are added, the flask is kept warm at 85° C. for an addition hour.

Upon completion, the emulsion is cooled to room temperature and passed through a 100-mesh filter, resulting in the final polymer product-a white-blue emulsion with a viscosity of approximately 700 mPa·s.

Example 3. Application of the Synthesized Polymer in Spray Coating Material

The resulting emulsion product is blended with coating additives, including 5% (w/w) wetting agent, 6% (w/w) film-forming agent, 2% (w/w) leveling agent and 1.5% (w/w) defoaming agent. The viscosity of this additive-enhanced mixture is approximately 90 mPa·s. This blend is suitable for application via spraying, utilizing an air pressure of 0.15 MPa. The sprayed film attains a thickness ranging from 10 to 30 μm, and its tack-free time is approximately 15 minutes.

Example 4. Evaluation of Antimicrobial Activity and Transparency of the Coating Material with the Synthesized Polymer The coating material, including the synthesized polymer emulsion, is applied through spraying onto a polypropylene plastic plate, forming a transparent, water resistant, antimicrobial and antiviral waterborne coating for subsequent testing. In accordance with ATCC 25923, ATCC 25922 and ATCC VR-1469 standards, the coating exhibits robust antimicrobial efficacy against *Staphylococcus aureus* (>99%), *Escherichia coli* (>99%) and H1N1 virus (>99%). Following 2000 cycles of wet abrasion with a 200 g load, the coating maintains >99% activity against *S. aureus*, and >99% against *E. coli* (as shown in Table 1). The coating consistently demonstrates >99% antiviral effectiveness against H1N1 before and after 2000 cycles of wet abrasion with a 200 g load (as shown in Table 2).

TABLE 1

Anti-bacterial performance of the polymer coating

| | | Antimicrobial activity (R) | Bacterial Reduction Efficacy |
|---|---|---|---|
| S. aureus | Coating | >2.0 | >99% |
| | Coating after 2000 cycles of wet wiping | >2.0 | >99% |
| E. coli | Coating | >2.0 | >99% |
| | Coating after 2000 cycles of wet wiping | >2.0 | >99% |

TABLE 2

Anti-viral performance of the polymer coating

| | Antiviral activity (R) | Virus Reduction Efficacy |
|---|---|---|
| Coating vs H1N1 | >2.0 | >99% |
| Coating vs H1N1 after 2000 cycles of wet wiping | >2.0 | >99% |

Figure 2:
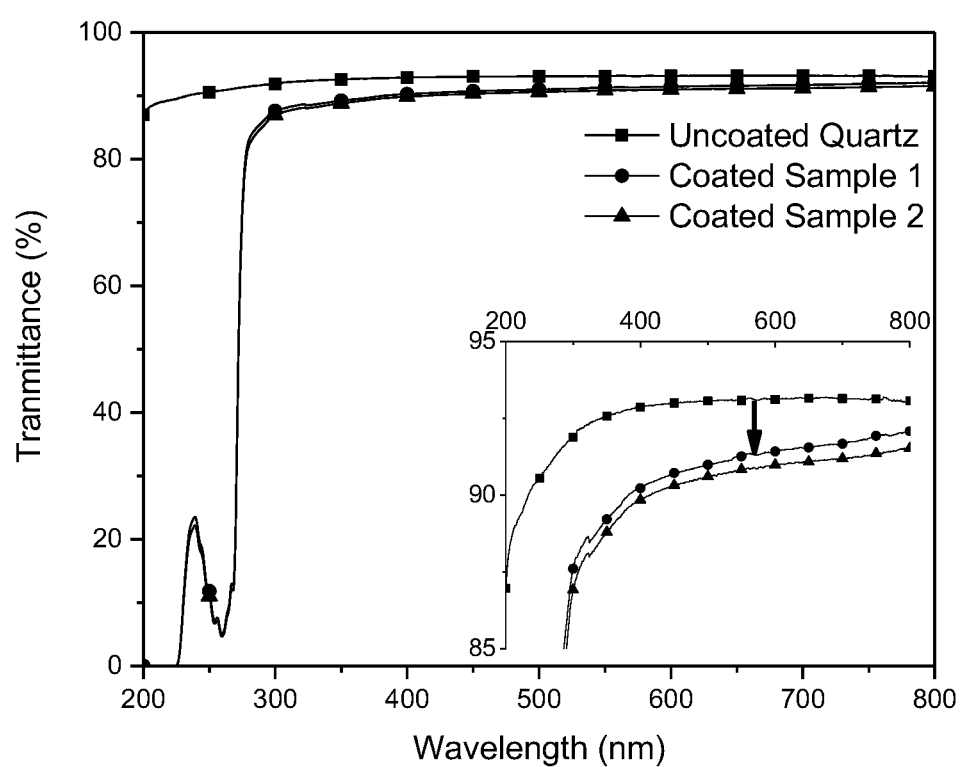
FIG. 2 depicts transmittance change of a quartz substrate before and after coating.

Furthermore, referring to FIG. 2, the transparency in the visible range (400~800 nm) of a coated quartz substrate is >92%, showing that there is only 3% transmittance loss compared with uncoated quartz.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A transparent, water resistant, antimicrobial and antiviral waterborne coating composition comprising a synthesized polymer, wherein the synthesized polymer comprises a vinyl group monomer, an acrylate monomer, a polymerizable quaternary ammonium compound (QAC) comprising an acrylate group and a cationic group a silane monomer, an adhesion monomer and an emulsification monomer, wherein the silane monomer is connected with the QAC for ensuring the anti-microbial and antiviral ability of the QAC; and
wherein the synthesized polymer has a structure of the following formula:

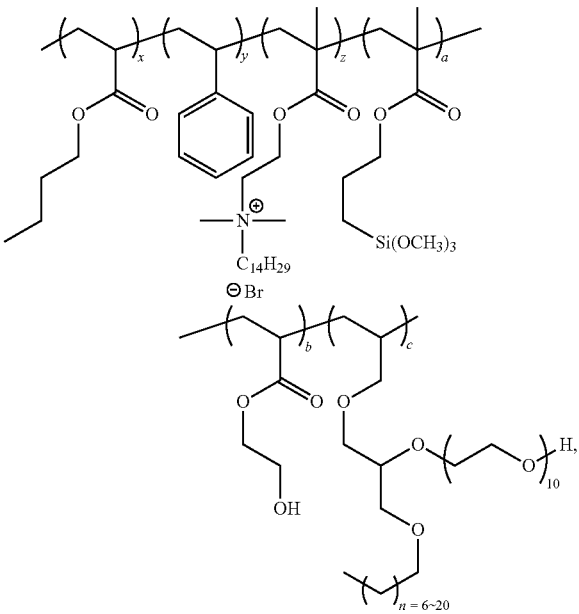

wherein the x, y, z, a, b, c are greater than or equal to 1.

2. The coating composition of claim 1, wherein the synthesized polymer is synthesized with a buffer solution having has a pH value range of 5-6.

3. A method of providing a transparent, water resistant, antimicrobial and antiviral waterborne coating on a substrate, comprising:

mixing the coating composition of claim 1 with a nonionic emulsifier, a buffer solution and an alcohol hydrolysis inhibitor to obtain a coating emulsion;

mixing the coating emulsion with a wetting agent, a film-forming agent, a leveling agent and a defoaming agent to obtain a coating agent; and air spraying the coating agent on a substrate to create a transparent, water resistant, antimicrobial and antiviral waterborne coating on the surface of the substrate.

4. The method of claim 3, wherein the nonionic emulsifier is capable of emulsion polymerization for both hydrophilic monomer and hydrophobic monomer.

5. The method of claim 3, wherein the buffer solution is a boron-based or a phosphate-based solution and has a pH value range of 5-6.

6. The method of claim 3, wherein the alcohol hydrolysis inhibitor has same alkyl chain as the silane monomer of the coating composition.

7. The method of claim 3, wherein the wetting agent is a surface additive suitable for solvent-borne, solvent-free and waterborne coating system to reduce surface tension.

8. The method of claim 3, wherein the substrate comprises glass, metal, plastic, rubber or wood.

* * * * *